US011825165B2

(12) United States Patent
Tan et al.

(10) Patent No.: US 11,825,165 B2
(45) Date of Patent: Nov. 21, 2023

(54) METHOD OF DETERMINING VIDEO RESOLUTION, COMPUTING DEVICE, AND COMPUTER-PROGRAM PRODUCT

(71) Applicant: Shanghai Bilibili Technology Co., Ltd., Shanghai (CN)

(72) Inventors: Zhaoxin Tan, Shanghai (CN); Jianqiang Ding, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 126 days.

(21) Appl. No.: 17/348,918

(22) Filed: Jun. 16, 2021

(65) Prior Publication Data
US 2021/0314664 A1 Oct. 7, 2021

Related U.S. Application Data

(63) Continuation of application No. PCT/CN2019/128457, filed on Dec. 25, 2019.

(30) Foreign Application Priority Data

Jan. 30, 2019 (CN) .......................... 201910091829.X

(51) Int. Cl.
H04N 21/466 (2011.01)
H04N 21/442 (2011.01)
H04N 21/2662 (2011.01)

(52) U.S. Cl.
CPC ....... *H04N 21/466* (2013.01); *H04N 21/2662* (2013.01); *H04N 21/44209* (2013.01)

(58) Field of Classification Search
CPC ............ H04N 21/466; H04N 21/2662; H04N 21/44209
See application file for complete search history.

(56) References Cited

U.S. PATENT DOCUMENTS

2009/0055519 A1   2/2009   Savoor et al.
2009/0307368 A1*  12/2009  Sriram ............. H04N 21/23406
                                                          709/231
(Continued)

FOREIGN PATENT DOCUMENTS

CN   105611321 A   5/2016
CN   105847895 A   8/2016
(Continued)

OTHER PUBLICATIONS

International Search Report dated Mar. 9, 2020, in International application No. PCT/CN2019/128457, filed on Dec. 25, 2019.
(Continued)

*Primary Examiner* — Robert J Hance
(74) *Attorney, Agent, or Firm* — McAndrews, Held & Malloy, Ltd.

(57) ABSTRACT

A method of determining video resolution is provided. The method of determining video resolution includes: determining a CDN corresponding to a video to be played in response to a video loading signal; acquiring a history network speed corresponding to the CDN; and determining an initial resolution of the video to be played according to the history network speed corresponding to the CDN. A computing device, and a non-transitory computer-program product are also provided.

16 Claims, 4 Drawing Sheets

(56) References Cited

U.S. PATENT DOCUMENTS

| | | | |
|---|---|---|---|
| 2011/0167170 A1* | 7/2011 | Kovvali | H04W 28/06 709/232 |
| 2012/0179834 A1* | 7/2012 | van der Schaar | H04N 21/23439 709/231 |
| 2012/0284756 A1* | 11/2012 | Kotecha | H04N 21/64769 725/98 |
| 2014/0359389 A1 | 12/2014 | Seastrom et al. | |
| 2014/0365651 A1* | 12/2014 | Soroushian | H04L 65/80 709/224 |
| 2019/0182518 A1* | 6/2019 | Mittal | H04N 21/23439 |

FOREIGN PATENT DOCUMENTS

| | | |
|---|---|---|
| CN | 106162233 A | 11/2016 |
| CN | 106231353 A | 12/2016 |
| CN | 107835200 A | 3/2018 |

OTHER PUBLICATIONS

Mok, Ricky K. P., et al.; IRate: Initial Video Bitrate Selection System for HTTP Streaming, IEEE Journal on Selected Areas in Communications, vol. 34, No. 6, Jun. 2016 (15 pages).

* cited by examiner

METHOD OF DETERMINING VIDEO RESOLUTION, COMPUTING DEVICE, AND COMPUTER-PROGRAM PRODUCT

CROSS-REFERENCE TO RELATED APPLICATIONS

The present application is a continuation under 35 U.S.C. 111(a) of PCT International Application No. PCT/CN2019/128457, filed on Dec. 25, 2019, which claims priority to Chinese patent application No. 201910091829.X, filed on Jan. 30, 2019, the entire content of which are hereby incorporated by reference in its entirety for all purposes.

TECHNICAL FIELD

The present application relates to a field of computer technologies, and more particularly to a method of determining video definition, a computing device, and a computer-program product.

BACKGROUND

With a development of video service, users need to watch online video increasingly. Video resolution and playing fluency are key factors affecting user experience. In order to meet the needs of different users, on a streaming media platform, a same film source often has various resolutions, such as: standard resolution, high resolution, super resolution and so on.

SUMMARY

One aspect of the present application provides a method, including: determining a CDN corresponding to a video to be played in response to a video loading signal; acquiring a history network speed corresponding to the CDN; and determining an initial resolution of the video to be played according to the history network speed corresponding to the CDN.

Yet another aspect of the present application provides a computing device, including: one or more processors; one or more non-transitory computer-readable storage mediums containing instructions configured to cause the one or more processors to perform operations including: determining a CDN corresponding to a video to be played in response to a video loading signal; acquiring a history network speed corresponding to the CDN; and determining an initial resolution of the video to be played according to the history network speed corresponding to the CDN.

Yet another aspect of the present application provides a computer-program product tangibly embodied in a machine-readable non-transitory storage medium that includes instructions configured to cause one or more processors to perform operations comprising: determining a CDN corresponding to a video to be played in response to a video loading signal; acquiring a history network speed corresponding to the CDN; and determining an initial resolution of the video to be played according to the history network speed corresponding to the CDN.

DETAILED DESCRIPTION

To make the purposes, technical solutions and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on some embodiments of the present application without creative efforts shall fall within the protection scope of the present application.

At present, in related art, when an initial segment of a video is played, official preset fixed resolution is generally used for playing.

However, the inventor has realized that during implementing concepts of the present application, there are at least following defects in related art: using the official preset fixed resolution as an initial resolution for playing the video tends to cause the video to be stuck.

It is considered that using the official preset fixed resolution as the resolution of playing the initial segment of the video tends to cause the video to be stuck in related art. In the method of determining video resolution provided by the present application, CDN corresponding to a video to be played is determined, a history network speed when a user uses the CDN to play the video in history (for example, the last time) is searched, then a resolution is determined according to the history network speed, and the resolution is taken as an initial resolution for playing the video to be played at this time. Since in an embodiment of the present application the importance of the network speed is fully considered when the initial resolution of the video to be played is determined, a maximum resolution that the network speed can support is taken as the initial resolution, which reduces stuck rate of the video watched by the user.

Figure 1:
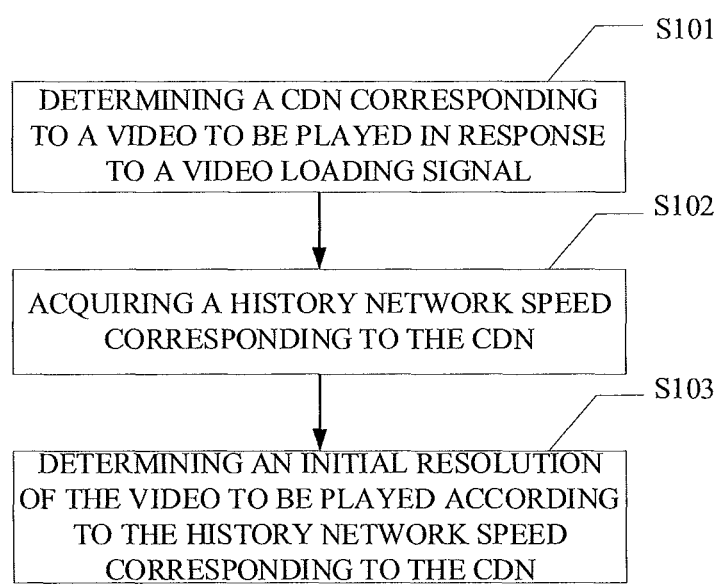
FIG. 1 illustrates a flowchart of a method of determining video resolution according to an embodiment of the present application.

FIG. 1 illustrates a flowchart of a method of determining video resolution according to an embodiment of the present application.

As shown in FIG. 1, the method of determining video resolution may include steps S101~S103.

Step S101, determining a CDN (Content Delivery Network) corresponding to a video to be played in response to a video loading signal.

It should be noted that some embodiments of the present application may be applied to a server, which may interact with a client, and the client may include a web side. To help understanding, application scenarios of some embodiments of the present application are illustrated below, it should be understood that the application scenarios described in some embodiments of the present application are only examples, and are not limiting. Taking the client as a computer as an example, in the application scene of some embodiments of the present application, the user wants to watch a video A through a computer webpage, and the user triggers a signal for playing the video A, before the computer plays the video A for the user, in order to avoid the defect in related art that using the official preset fixed resolution as the initial resolution for playing the video tends to cause the video to be stuck, the initial resolution of the video A can be determined using video resolution determination scheme of the present application.

In some embodiments of the present application, the CDN corresponding to the video to be played, such as the video A, can be determined first, and then step S102 is performed.

Step S102, acquiring a history network speed corresponding to the CDN.

For the same user, the history network speed corresponding to the CDN may include the network speed when the client uses the CDN to play video in history. In some embodiments, it may be an average network speed when the client used the CDN to play the video the last time.

It should be noted that before applying some embodiments of the present application, multiple history network speeds and CDNs corresponding to respective history network speeds may have been stored in the server, and they can be stored in a map.

For example, a stored data format map includes three CDNs and the history network speeds corresponding to respective CDNs, which includes: 'cdna.acgvideo.com': 400 KB/s; 'cdnb.acgvideo.com': 500 KB/s; 'cdnc.acgvideo.com': 900 KB/s. If the video to be played is the video A, and the video A is scheduled to the cdnb.acgvideo.com, the history network speed corresponding to the acquired CDN may be 500 KB/s.

Step S103, determining an initial resolution of the video to be played according to the history network speed corresponding to the CDN.

In some embodiments of the present application, the determining the initial resolution of the video to be played according to the history network speed corresponding to the CDN may include: calculating a maximum supportable playing code rate according to the history network speed corresponding to the CDN; acquiring corresponding relationships between preset resolutions of the video to be played and playing code rates; determining a preset resolution corresponding to the maximum supportable playing code rate according to the corresponding relationships; and taking the preset resolution corresponding to the maximum supportable playing code rate as the initial resolution.

The calculating the maximum supportable playing code rate according to the history network speed corresponding to the CDN may include: acquiring a preset safety weighting value; and calculating the maximum supportable playing code rate according to the history network speed corresponding to the CDN and the preset safety weighting value. The preset safety weighting value set by some embodiments of the present application can be used for preventing network jitter, for example, the preset safety weighting value may be 0.9.

The maximum supportable playing code rate can be calculated according to the following formula:

$$K = S \times 8 \times N,$$

where K represents the maximum supportable playing code rate, S represents the history network speed corresponding to the CDN, and N represents the preset safety weighting value.

For example, if the acquired history network speed corresponding to the CDN is 500 KB/s, and the preset safety weighting value is 0.9, the maximum supportable playing code rate K=3600 kbps.

Some embodiments of the application may include a plurality of preset resolutions and playing code rates corresponding to respective preset resolutions. Determining preset resolution corresponding to the maximum supportable playing code rate according to the corresponding relationship can be: determining a maximum playing code rate from the plurality of playing code rates where the maximum playing code rate is the maximum one of those less than or equal to the maximum supportable playing code rate, and then taking the preset resolution corresponding to the maximum playing code rate as the initial resolution.

For example, the video to be played is the video A, and the corresponding relationship between the preset resolution of the video A and the playing code rate is as follows: 1080 P+: 8000 kbps; 1080 P: 4000 kbps; 720 P: 2000 kbps; 480 P: 1000 kbps; 360 P: 500 kbps. Since the calculated maximum supportable playing code rate is 3600 kbps, the maximum playing code rate which 3600 kbps is greater than or equal to is 2000 kbps, and the preset resolution corresponding to the playing code rate of 2000 kbps is 720 P, the 720 P can be taken as the initial resolution of the video A.

In an alternative embodiment, the method of determining video resolution may further include: in response to determining that the history network speed corresponding to the CDN does not exist, determining whether history network speeds corresponding to other CDNs exist; in response to determining that the history network speeds corresponding to the other CDNs exist, determining an average value of the history network speeds corresponding to the other CDNs; and determining the initial resolution according to the average value of the history network speeds corresponding to the other CDNs.

In some embodiments of the application, if a system does not store the history network speed corresponding to the CDN used by the video to be played, even does not store the CDN used by the video to be played at all, but stores the history network speeds which the user used for watching video by using the other CDNs, in some embodiments of the application the initial resolution can be determined according to the average value of the history network speeds corresponding to the other CDNs. The average value of the history network speeds corresponding to the other CDNs can be calculated in advance, for example, it can be stored in the map; or it can be calculated at the time of use.

For example, in conjunction with the above example, if the video A is scheduled to the cdnd.acgvideo.com and there is no history network speed corresponding to the cdnd.acgvideo.com in the map, the initial resolution can be determined according to the average value of the history network speeds corresponding to the other CDNs (including the cdna.acgvideo.com, the cdnb.acgvideo.com, the cdnc.acgvideo.com). If the map further stores: an average value of 400 KB/s corresponding to 'cdna.acgvideo.com', 500 KB/s corresponding to 'cdnb.acgvideo.com' and 900 KB/s corresponding to 'cdnc.acgvideo.com', that is the average (total average speed, also known as the average value of the history network speeds corresponding to the other CDNs) is: 600 KB/s, the average value can be acquired directly from the map, and the maximum supportable playing code rate K=4230 kbps is obtained according to the average value and the formula, it is known that the maximum playing code rate is 4000 kbps which the maximum supportable playing code rate is greater than or equal to according to the corresponding relationship, and the preset resolution corresponding to the maximum playing code rate 4000 kbps is 1080 P, then the 1080 P can be taken as the initial resolution of the video A.

In an alternative embodiment, the method of determining video resolution may further include: in response to determining that the history network speeds corresponding to the other CDNs do not exist, acquiring standard resolution; and taking the standard resolution as the initial resolution.

In some embodiments of the present application, if the map does not exist, or no CDNs exist in the map, or a history network speed corresponding to any CDN does not exist in the map, in order to ensure normal viewing of the user, the standard resolution preset by the system can be taken as the initial resolution.

In an alternative embodiment, the method of determining video resolution may further include: when playing of the video to be played is finished, receiving an average downloading network speed of the video to be played sent by the client, where the client is used for playing the video to be played; and updating the history network speed corresponding to the CDN according to the average downloading network speed of the video to be played.

In order to improve accuracy of the initial resolution determined next time, after the video to be played finishes playing this time, the client can calculate the average downloading network speed (the average downloading network speed can be an amount of data in unit time) when the video to be played is downloaded, then send the calculated average downloading network speed to the server, and the server can replace the history network speed corresponding to the CDN stored in the map with the average downloading network speed, or add a corresponding relationship between the CDN and the history network speed. Alternatively, if an average value of history network speeds corresponding to all CDNs is pre-stored in the map, in some embodiments of the present application the average value also can be updated. Alternatively, if the average value of history network speeds corresponding to all CDNs is not stored in the map, in some embodiment of the present application, the average value can also be calculated in advance as required and stored in the map.

For example, if the CDN used by the video to be played is the cdnb.acgvideo.com, the history network speed corresponding to the cdnb.acgvideo.com in the map is 500 KB/s, and the average downloading network speed for downloading the video to be played this time is 560 KB/s, then the history network speed corresponding to cdnb.acgvideo.com in the map can be replaced by 560 KB/s, and the average value of the history network speeds corresponding to all CDNs (including the cdna.acgvideo.com, the cdnb.acgvideo.com, and the cdnc.acgvideo.com) can also be recalculated, e.g., (400+560+900)/3=620 KB/s, then the 'average' in the map can be updated to 620 KB/s.

For another example, if the CDN used by the video to be played is the cdnd.acgvideo.com, the history network speed corresponding to the cdnd.acgvideo.com does not exist in the map, and the average downloading network speed for downloading the video to be played using the cdnd.acgvideo.com is 800 KB/s at this time, the corresponding relationship between the cdnd.acgvideo.com and the history network speed 800 KB/s can be added in the map, and the average value of the historical network speeds corresponding to all CDNs (including cdna.acgvideo.com, cdnb.acgvideo.com, cdnc.acgvideo.com, and cdnd.acgvideo.com) can also be recalculated, e.g., as (400+500+900+800)/4=650 KB/s, then the 'average' in the map can be updated to 650 KB/s.

In the method of determining video resolution provided by the present application, the CDN corresponding to the video to be played is determined, the history network speed when the user uses the CDN to play the video in history (for example, the last time) is searched, then the resolution is determined according to the history network speed, and the resolution is taken as the initial resolution for playing the video to be played at this time. Since in some embodiments of the present application the importance of the network speed is fully considered when the initial resolution of the video to be played is determined, the maximum resolution that the network speed can support is used as the initial resolution, which reduces stuck rate of the video watched by the user, and avoids the defect that using the official preset fixed resolution as the initial resolution of the video tends to cause the video to be stuck in related art.

Figure 2:
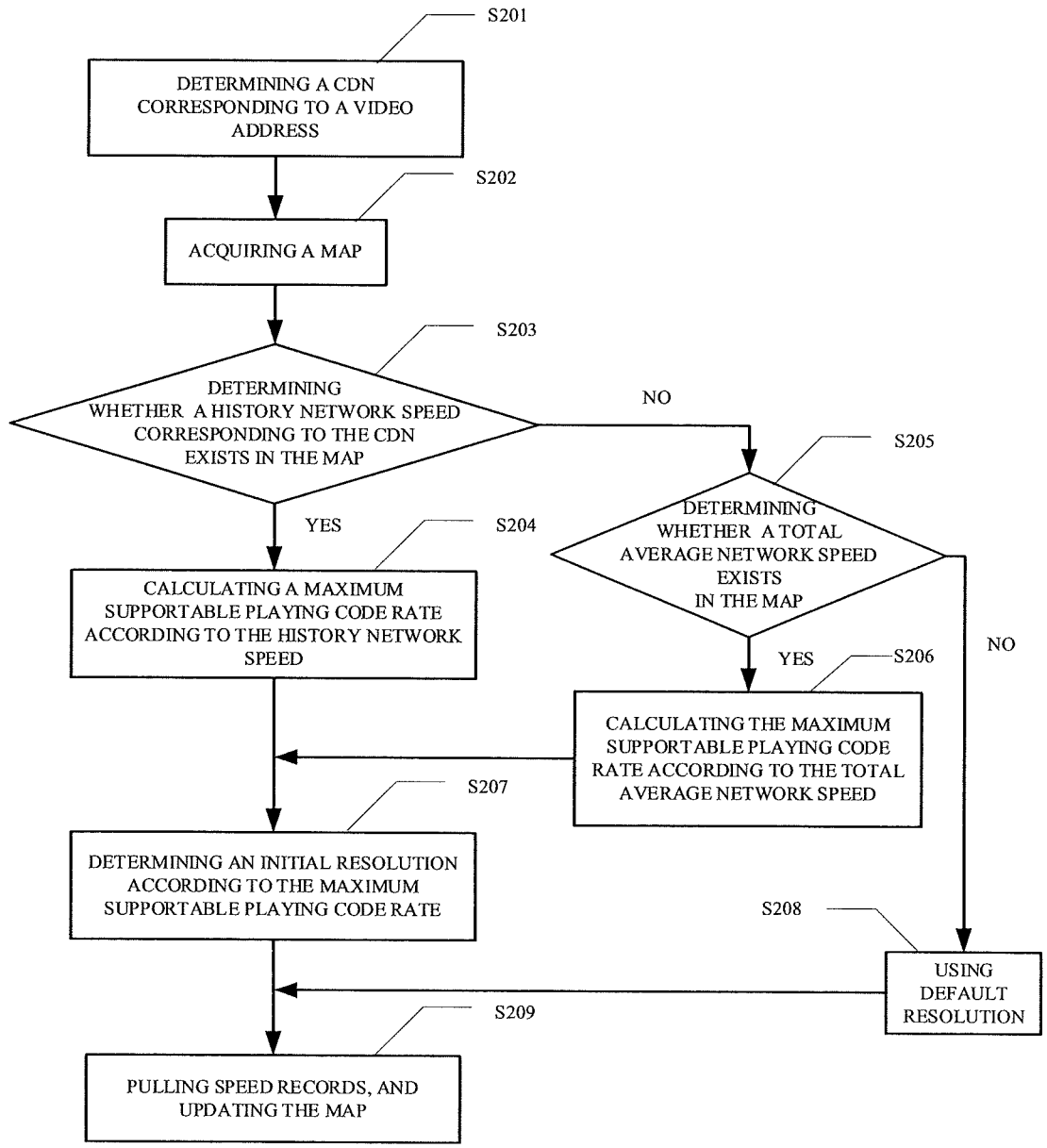
FIG. 2 illustrates a flowchart of a method of determining video resolution according to another embodiment of the present application.

FIG. 2 illustrates a flowchart of the method of determining video resolution according to another embodiment of the present application.

As shown in FIG. 2, the method of determining video resolution may include steps S201~S209.

Step S201, determining a CDN corresponding to a video address;

Step S202, acquiring a map;

Step S203, determining whether there is a history network speed corresponding to the CDN in the map, if there is, executing step S204, and if not, executing step S205;

Step S204, calculating a maximum supportable playing code rate according to the history network speed;

Step S205, determining whether there is a total average network speed in the map, if there is, executing step S206, and if not, executing step S208;

Step S206, calculating the maximum supportable playing code rate according to the total average network speed;

Step S207, determining an initial resolution according to the maximum supportable playing code rate;

Step S208, using default resolution;

Step S209, pulling speed records, and updating the map.

According to some embodiments of the present application, determining the CDN used by the video to be played maybe include: determining the CDN corresponding to the video address, and then acquiring the map, where for each user, in some embodiments of the present application the average network speed can be memorized when the user uses the CDN to play the video last time and store the average network speed in the map. Whether there is the history network speed corresponding to the CDN in the map is determined, if the history network speed corresponding to the CDN exist in the map, the maximum supportable playing code rate according to the history network speed is calculated, then the initial resolution according to the maximum supportable playing code rate is determined. A specific process of determining the initial resolution is as described in the above-mentioned embodiments, which is not repeated here. In further, after playing of the video to be played is finished, the average network speed (also known as the average downloading network speed) is pulled at which the video is played this time, and the history network speed corresponding to the CDN in the map is replaced with the average network speed.

If the history network speed corresponding to the CDN does not exist in the map, it is determined whether there is the total average network speed (the history network speeds corresponding to the other CDNs) in the map. If the total average network speed exists in the map, the maximum supportable playing code rate is calculated according to the total average network speed, and the initial resolution is determined according to the maximum supportable playing code rate. Further, after playing of the video to be played is finished, the average network speed (also known as the average downloading network speed) at which the video is played this time is pulled, and the corresponding relationship between the CDN and the average network speed is added to the map.

If the total average network speed does not exist in the map, a system default resolution is taken as the initial resolution, and after playing of the video to be played is finished, the average network speed (also known as the average downloading network speed) at which the video is played this time is pulled, and the corresponding relationship between the CDN and the average network speed is added in the map.

Alternatively, in some embodiments of the application the total average network speed stored in the map also can be updated.

According to some embodiments of the application, a problem that the user's single point of access for different CDNs may have different connectivity and network conditions can be avoided, and the stuck rate of the video watched by the user can be reduced.

Figure 3:
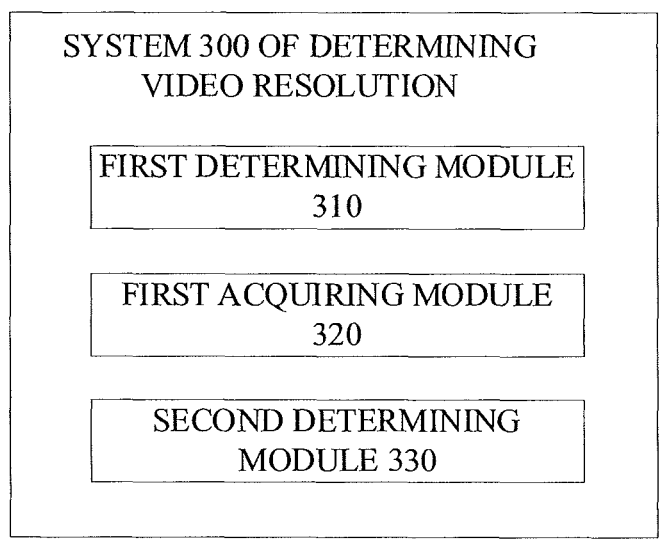
FIG. 3 illustrates a block diagram of a system of determining video resolution according to an embodiment of the present application.

FIG. 3 illustrates a block diagram of a system of determining video resolution according to an embodiment of the present application.

As shown in FIG. 3, the system 300 of determining video resolution may include a first determining module 310, a first acquiring module 320, and a second determining module 330.

The first determining module 310 is configured to determine a CDN corresponding to a video to be played in response to a video loading signal.

The first acquiring module 320 is configured to acquire a history network speed corresponding to the CDN.

The second determining module 330 is configured to determine an initial resolution of the video to be played according to the history network speed corresponding to the CDN.

In the system of determining video resolution provided by the present application, the CDN corresponding to the video to be played is determined, the history network speed when the user uses the CDN to play the video in history (for example, the last time) is searched, then the resolution is determined according to the history network speed, and the resolution is taken as the initial resolution for playing the video to be played at this time. Since in some embodiments of the present application the importance of the network speed is fully considered when the initial resolution of the video to be played is determined, the maximum resolution that the network speed can support is taken as the initial resolution, which reduces stuck rate of the video watched by the user, and avoids the defect that using the official preset fixed resolution as the initial resolution of the video tends to cause the video to be stuck in related art.

In an alternative embodiment, the second determining module may include: a calculating unit for calculating a maximum supportable playing code rate according to the history network speed corresponding to the CDN; an acquiring unit for acquiring a corresponding relationship between preset resolution of the video to be played and a playing code rate; a determining unit for determining preset resolution corresponding to the maximum supportable playing code rate according to the corresponding relationship; and a processing unit for taking the preset resolution corresponding to the maximum supportable playing code rate as the initial resolution.

In an alternative embodiment, the calculating module may include: an acquiring subunit for acquiring a preset safety weighting value; and a calculating subunit for calculating the maximum supportable playing code rate according to the history network speed corresponding to the CDN and the preset safety weighting value.

In an alternative embodiment, the system of determining video resolution may further include: a determining module for, in response to determining that the history network speed corresponding to the CDN does not exist, determining whether history network speeds corresponding to other CDNs exist; a calculating module for, in response to determining that the history network speeds corresponding to the other CDNs exist, calculating an average value of the historical network speeds corresponding to the other CDNs; and a third determining module for determining the initial resolution according to the average value of the history network speeds corresponding to the other CDNs.

In an alternative embodiment, the system of determining video resolution may further include: a second acquiring module for, in response to determining that the history network speeds corresponding to the other CDNs do not exist, acquiring standard resolution; and a processing module for taking the standard resolution as the initial resolution.

In an alternative embodiment, the system of determining video resolution may further include: a receiving module for, when playing of the video to be played is finished, receiving an average downloading network speed of the video to be played sent by a client, where the client is used for playing the video to be played; and an updating module for updating the history network speed corresponding to the CDN according to the average downloading network speed of the video to be played.

Figure 4:
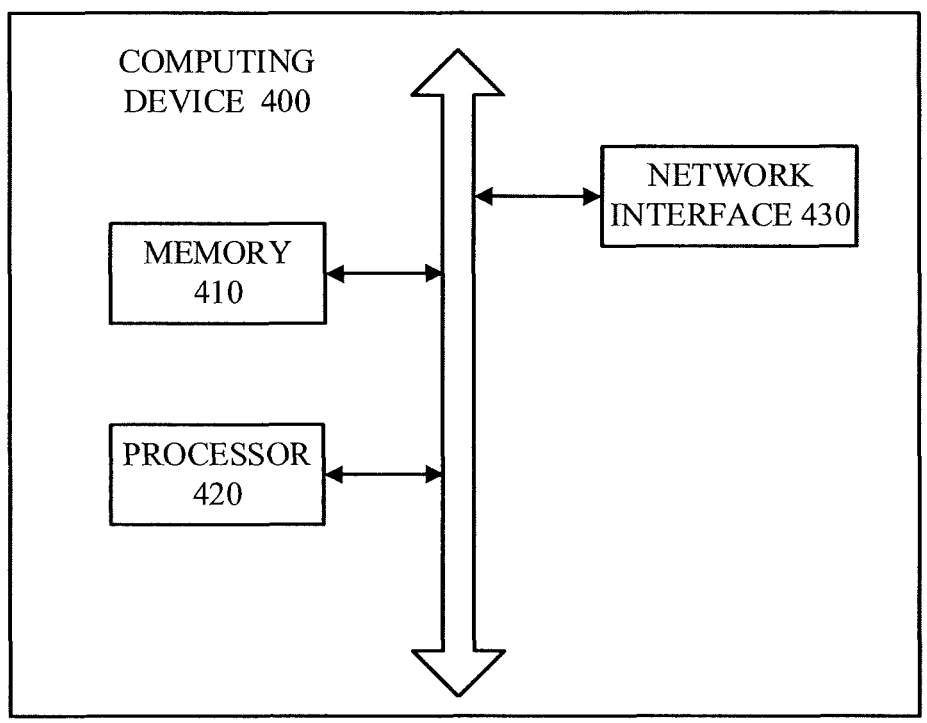
FIG. 4 illustrates a diagram of hardware architecture of a computing device for implementing a method of determining video resolution according to an embodiment of the present application.

FIG. 4 illustrates a diagram of hardware architecture of a computing device for implementing a method of determining video resolution according to an embodiment of the present application. In some embodiments, the computing device 400 is a device capable of automatically performing numerical calculations and/or information processing according to predefined or stored instructions. For example, the computing device 400 may be a smartphone, a tablet, a laptop, a desktop computer, a rack server, a blade server, a tower server, or a cabinet server (including stand-alone servers, or a cluster of multiple servers), and so on. As shown in FIG. 4, the computing device 400 includes, but is not limited to, a memory 410, a processor 420, and a network interface 430 that can be communicated with each other through a system bus.

The memory 410 includes at least one type of computer-readable storage medium. The readable storage medium includes a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the memory 410 may be an internal storage module of the computing device 400 such as a hard disk or memory of the computing device 400. In other embodiments, the memory 410 may also be an external storage device of the computing device 400, such as a plugged hard disk provided on the computing device 400, a smart media card (SMC), secure digital (SD) card, a flash memory card, and the like. Of course, the memory 410 may also include both the internal storage module and the external storage device of the computing device 400. In some embodiments, the memory 410 is generally used to store an operating system and various types of application software installed in the computing device 400, such as program codes of the method of determining video resolution and the like. In addition, the memory 410 may also be used to temporarily store various types of data that have been or will be outputted.

The processor 420, in some embodiments, may be a Central Processing Unit (CPU), a controller, a microprocessor, or other data processing chip. The processor 420 is generally used to control the overall operation of the computing device 400 such as performing control and processing related to data interaction or communication with the computing device 400. In some embodiments, the processor 420 is used to run program code stored in the memory 410 or process data.

The network interface 430 may include a wireless network interface or a wired network interface which is generally used to establish a communication connection between the computing device 400 and other computing devices. For example, the network interface 430 is used for connecting the computing device 400 to an external terminal via a network and establishing a data transmission channel and a communication connection between the computing device 400 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 4 shows only a computing device 400 having components 410-430, but it is understood that it is not required to implement all of the shown components and that more or fewer parts can be implemented in lieu thereof.

In some embodiments, the method of determining video resolution stored in the memory 410 may be divided into one or more program modules and executed by one or more processors (processor 420 in some embodiments) to complete the present application.

some embodiments further provide a computer-readable storage medium, which stores computer-readable instructions that upon execution by a processor implement steps of the method of determining video resolution in some embodiments.

In some embodiments, the computer-readable storage medium includes a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the computer-readable storage medium may be an internal storage cell of the computing device such as a hard disk or memory of the computing device. In other embodiments, the memory may also be an external storage device of the computing device, such as a plugged hard disk provided on the computing device, a smart media card (SMC), a secure digital (SD) card, a flash memory card, and the like. Of course, the computer-readable storage medium may also include both the internal storage module and the external storage device of the computing device. In some embodiments, the computer-readable storage medium is generally used to store an operating system and various types of application software installed in the computing device, such as program codes of the method of determining video resolution and the like. In addition, the memory may also be used to temporarily store various types of data that have been or will be outputted.

Apparently, it should be appreciated by those skilled in the art that each module or step described in some embodiments of the present application can be realized by a general-purpose and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

In the method of playing audio and video, computing device, and readable storage medium provided by the present application, the CDN corresponding to the video to be played is determined, the history network speed when the user uses the CDN to play the video in history (for example, the last time) is searched, then the resolution is determined according to the history network speed, and the resolution is taken as the initial resolution for playing the video to be played at this time. Since in some embodiments of the present application the importance of the network speed is fully considered when the initial resolution of the video to be played is determined, the maximum resolution that the network speed can support is taken as the initial resolution, which reduces stuck rate of the video watched by the user, and avoids the defect that using the official preset fixed resolution as the initial resolution for playing the video tends to cause the video to be stuck in related art.

The embodiments described above are just specific embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method, comprising:
   determining a Content Delivery Network (CDN) corresponding to a video to be played in response to a video loading signal;
   determining that a history network speed corresponding to the CDN does not exist and that history network speeds corresponding to other CDNs exist;
   calculating an average value of the history network speeds corresponding to the other CDNs; and
   determining an initial resolution of the video to be played according to the average value of the history network speeds corresponding to the other CDNs.

2. The method of claim 1, wherein the determining an initial resolution of the video to be played according to the average value of the history network speeds corresponding to the other CDNs comprises:
   calculating a maximum supportable playing code rate according to the average value of the history network speeds corresponding to the other CDNs;
   acquiring corresponding relationships between preset resolutions of the video to be played and playing code rates;
   determining a preset resolution corresponding to the maximum supportable playing code rate according to the corresponding relationships; and taking the preset resolution corresponding to the maximum supportable playing code rate as the initial resolution.

3. The method of claim 2, wherein the calculating a maximum supportable playing code rate according the average value of the history network speeds corresponding to the other CDNs comprises:
acquiring a preset safety weighting value; and
calculating the maximum supportable playing code rate according to the average value of the history network speeds corresponding to the other CDN and the preset safety weighting value.

4. The method of claim 2, wherein the determining a preset resolution corresponding to the maximum supportable playing code rate according to the corresponding relationships comprises:
determining a maximum playing code rate from the plurality of playing code rates, wherein the maximum playing code rate is a maximum one of a subset of the plurality of playing code rates less than or equal to the maximum supportable playing code rate;
determining a preset resolution corresponding to the maximum playing code rate according to the corresponding relationships; and
taking the preset resolution corresponding to the maximum playing code rate as the preset resolution corresponding to the maximum supportable playing code rate.

5. The method of claim 1, further comprising:
when playing of the video to be played is finished, receiving an average downloading network speed of the video to be played sent by a client, wherein the client is used for playing the video to be played; and
adding a corresponding relationship between the CDN and the average downloading network speed of the video to be played.

6. A computing device comprising:
one or more processors; and
one or more non-transitory computer-readable storage mediums containing instructions configured to cause the one or more processors to perform operations including:
determining a Content Delivery Network (CDN) corresponding to a video to be played in response to a video loading signal;
in response to determining that a history network speed corresponding to the CDN exists:
acquiring the history network speed corresponding to the CDN; and
determining an initial resolution of the video to be played according to the history network speed corresponding to the CDN;
in response to determining that the history network speed corresponding to the CDN does not exist:
in response to determining that history network speeds corresponding to other CDNs exist:
calculating an average value of the history network speeds corresponding to the other CDNs; and
determining the initial resolution according to the average value of the history network speeds corresponding to the other CDNs.

7. The computing device of claim 6, wherein the determining an initial resolution of the video to be played according to the history network speed corresponding to the CDN comprises:

calculating a maximum supportable playing code rate according to the history network speed corresponding to the CDN;
acquiring corresponding relationships between preset resolutions of the video to be played and playing code rates;
determining a preset resolution corresponding to the maximum supportable playing code rate according to the corresponding relationships; and
taking the preset resolution corresponding to the maximum supportable playing code rate as the initial resolution.

8. The computing device of claim 7, wherein the calculating a maximum supportable playing code rate according to the history network speed corresponding to the CDN comprises:
acquiring a preset safety weighting value; and
calculating the maximum supportable playing code rate according to the history network speed corresponding to the CDN and the preset safety weighting value.

9. The computing device of claim 7, wherein the determining a preset resolution corresponding to the maximum supportable playing code rate according to the corresponding relationships comprises:
determining a maximum playing code rate from the plurality of playing code rates, wherein the maximum playing code rate is a maximum one of a subset of the plurality of playing code rates less than or equal to the maximum supportable playing code rate;
determining a preset resolution corresponding to the maximum playing code rate according to the corresponding relationships; and
taking the preset resolution corresponding to the maximum playing code rate as the preset resolution corresponding to the maximum supportable playing code rate.

10. The computing device of claim 6, wherein the one or more non-transitory computer-readable storage mediums further containing instructions configured to cause the one or more processors to perform operations including:
in response to determining that the history network speeds corresponding to the other CDNs do not exist, acquiring standard resolution; and
taking the standard resolution as the initial resolution.

11. The computing device of claim 6, wherein the one or more non-transitory computer-readable storage mediums further containing instructions configured to cause the one or more processors to perform operations including:
when playing of the video to be played is finished, receiving an average downloading network speed of the video to be played sent by a client, wherein the client is used for playing the video to be played; and
updating the history network speed corresponding to the CDN according to the average downloading network speed of the video to be played.

12. A non-transitory computer-program product tangibly embodied in a machine-readable non-transitory storage medium that includes instructions configured to cause one or more processors to perform operations comprising:
determining a Content Delivery Network (CDN) corresponding to a video to be played in response to a video loading signal;
in response to determining that a history network speed corresponding to the CDN exists:
acquiring the history network speed corresponding to the CDN; and determining an initial resolution of the video to be played according to the history network speed corresponding to the CDN;
in response to determining that the history network speed corresponding to the CDN does not exist:
in response to determining that history network speeds corresponding to other CDNs exist:
calculating an average value of the history network speeds corresponding to the other CDNs; and
determining the initial resolution according to the average value of the history network speeds corresponding to the other CDNs.

13. The non-transitory computer-program product of claim 12, wherein the determining an initial resolution of the video to be played according to the history network speed corresponding to the CDN comprises:
calculating a maximum supportable playing code rate according to the history network speed corresponding to the CDN;
acquiring corresponding relationships between preset resolutions of the video to be played and playing code rates;
determining a preset resolution corresponding to the maximum supportable playing code rate according to the corresponding relationships; and
taking the preset resolution corresponding to the maximum supportable playing code rate as the initial resolution.

14. The non-transitory computer-program product of claim 12, wherein the calculating a maximum supportable playing code rate according to the history network speed corresponding to the CDN comprises:
acquiring a preset safety weighting value; and
calculating the maximum supportable playing code rate according to the history network speed corresponding to the CDN and the preset safety weighting value.

15. The non-transitory computer-program product of claim 12, further comprise instructions configured to cause one or more processors to perform operations comprising:
in response to determining that the history network speeds corresponding to the other CDNs do not exist, acquiring standard resolution; and
taking the standard resolution as the initial resolution.

16. The non-transitory computer-program product of claim 12, further comprise instructions configured to cause one or more processors to perform operations comprising:
when playing of the video to be played is finished, receiving an average downloading network speed of the video to be played sent by a client, wherein the client is used for playing the video to be played; and
updating the history network speed corresponding to the CDN according to the average downloading network speed of the video to be played.

* * * * *